Oct. 16, 1951  E. F. GREEDY ET AL  2,571,865
CORN PICKER WITH CUTTER
Filed March 4, 1947  4 Sheets-Sheet 3
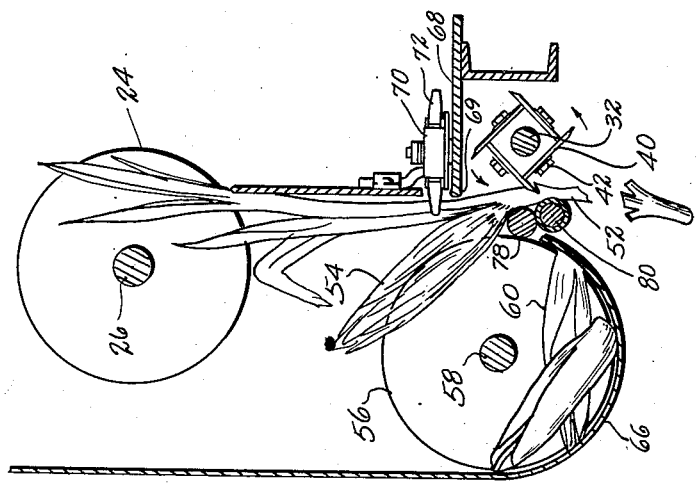
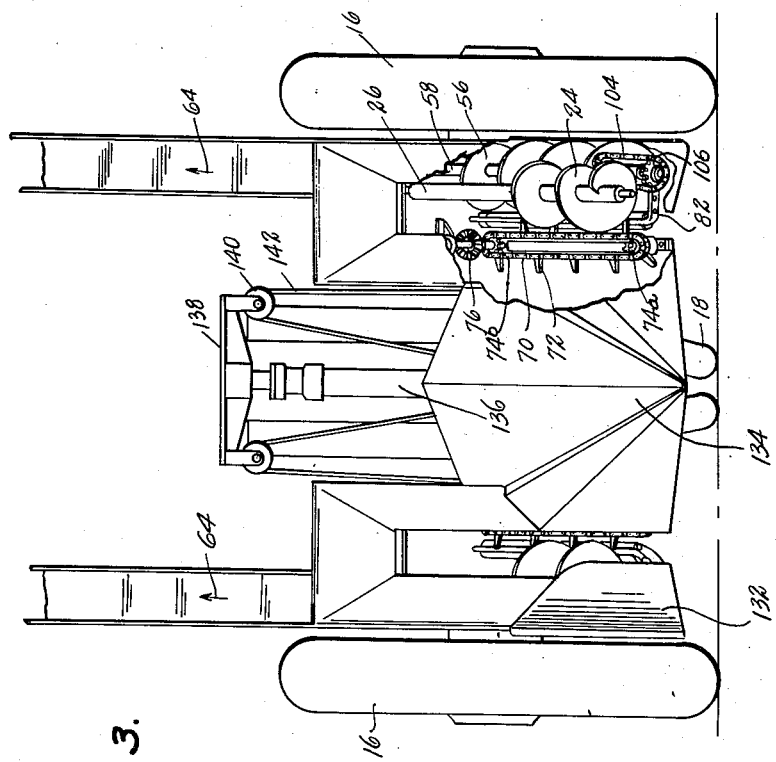
Inventors
Edwin F. Greedy,
Edward J. Schaaf,
By McMorrow, Berman & Davidson
Attorneys Oct. 16, 1951 — E. F. GREEDY ET AL — 2,571,865
CORN PICKER WITH CUTTER
Filed March 4, 1947 — 4 Sheets-Sheet 4
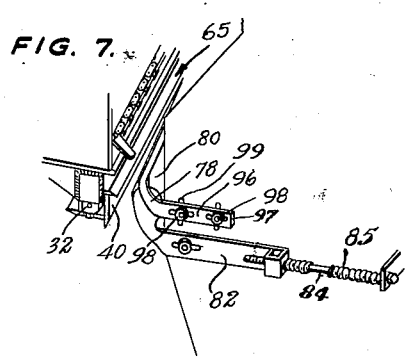
FIG. 7.
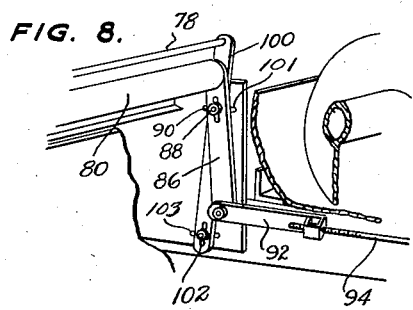
FIG. 8.
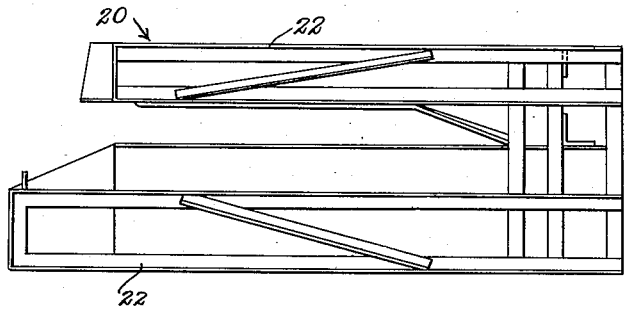
FIG. 9.
FIG. 10.
FIG. 11
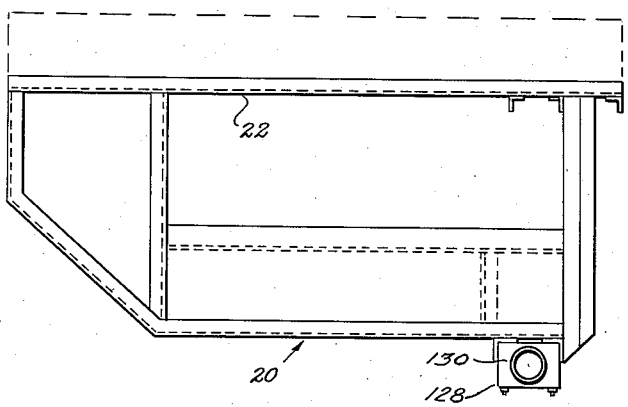
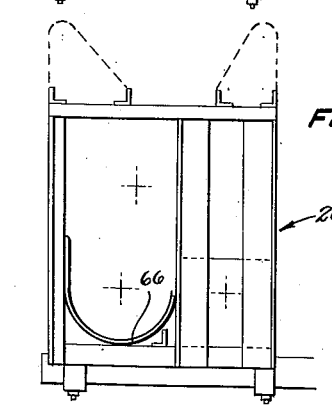
FIG. 12.
Inventor
Edwin F. Greedy, and
Edward J. Schaaf,
By McMorrow, Berman & Davidson
Attorneys Patented Oct. 16, 1951

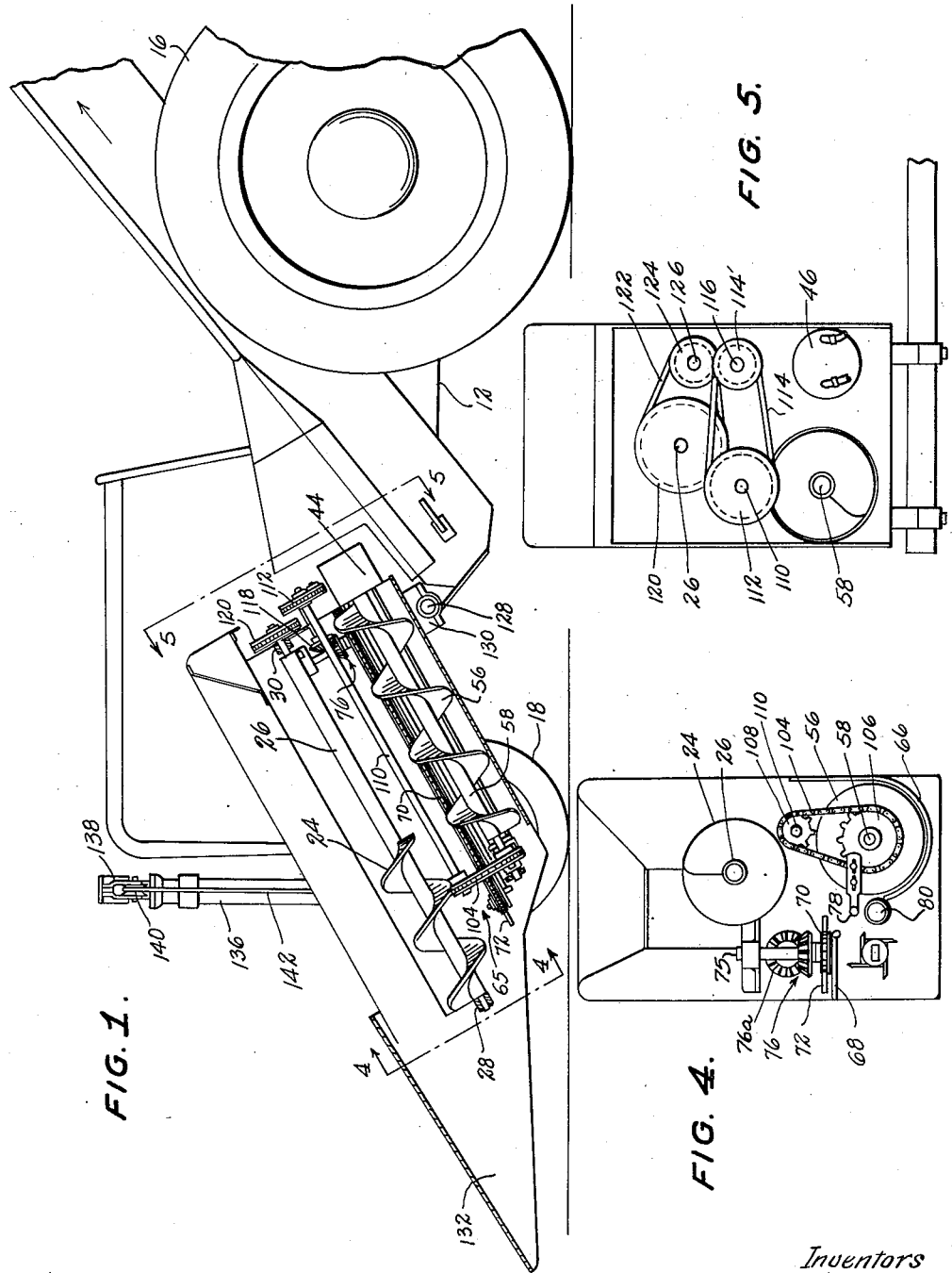

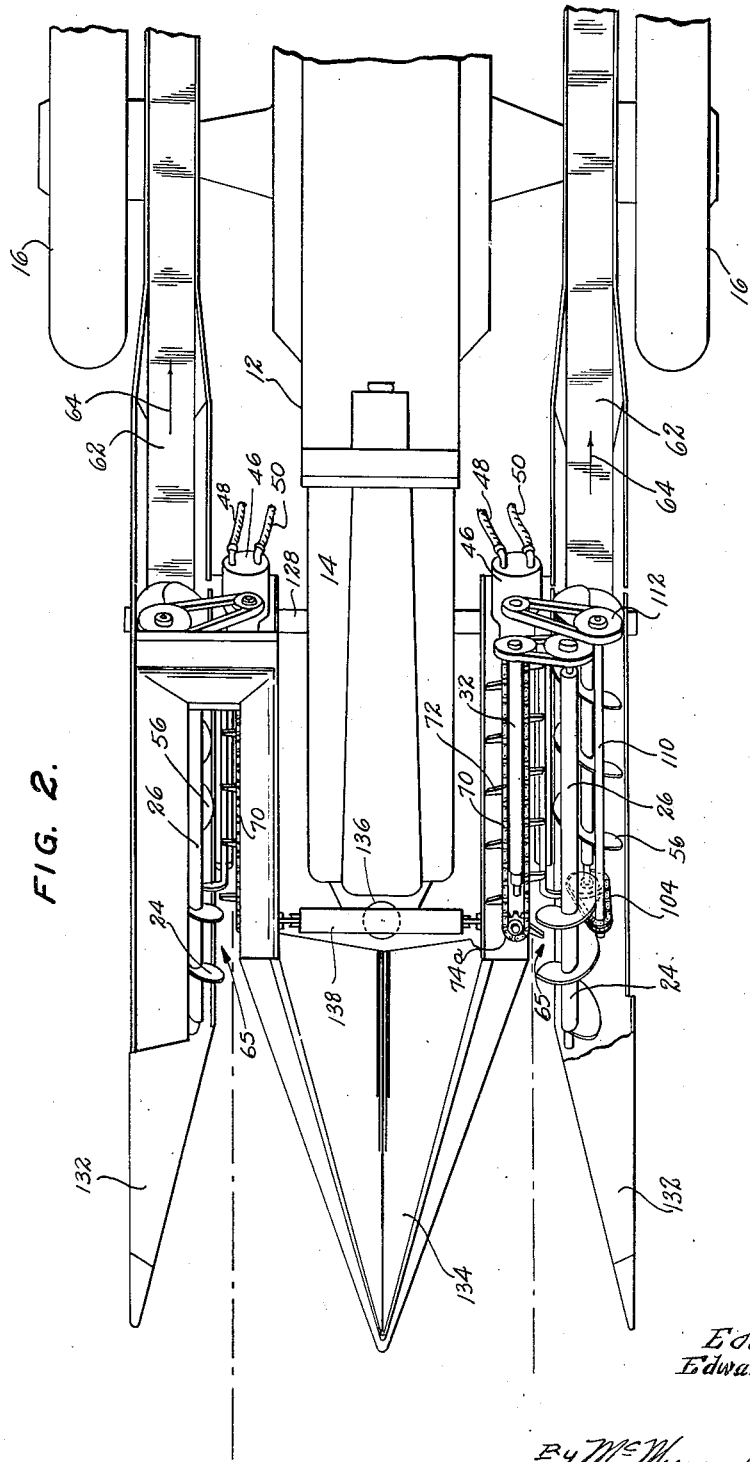

2,571,865

UNITED STATES PATENT OFFICE 2,571,865

CORN PICKER WITH CUTTER

Edwin F. Greedy and Edward J. Schaaf, Anderson, Iowa, assignors to The Midwest Co., Nebraska City, Nebr., a corporation Application March 4, 1947, Serial No. 732,218

5 Claims. (Cl. 56—64)

1

This invention relates to improvements in corn harvesters.

An object of the invention is to provide a corn harvester which may be mounted on a tractor and powered by the tractor motor, the harvester being used for the purpose of snapping sweet corn and also for the harvesting of field corn.

Another object of the invention is to provide a mounted picker that can be used either as a single or double row machine, depending upon the size of the tractor on which it is to be mounted.

A further object of the invention is to provide a corn harvester having means for engaging standing corn stalks as the harvester moves through the field, and including means for chopping the stalks into small lengths, the ears being cut off from the stalk and including a corn elevator.

Still another object of the invention is to provide a corn picker and harvester which is simple in design, relatively inexpensive to manufacture, and which is effective for harvesting corn quickly and at a low cost.

Other objects and advantages of the invention will become apparent from the following description of a preferred embodiment thereof as illustrated in the accompanying drawings, and in which:

Figure 1 is a side elevational view of the harvester, with a portion of the outer casing removed to show the construction.

Figure 2 is a top plan view of the harvester shown in Figure 1, one of the covers being removed to show the arrangement of the parts.

Figure 3 is a front elevational view of the harvester, as seen from the left side of Figures 1 and 2.

Figure 4 is a front end view of the operating mechanism on one side of the harvester as seen looking obliquely upward from the left of Figure 1, from line 4—4.

Figure 5 is a rear end view of the operating mechanism as seen looking from line 5—5 of Figure 1, obliquely forwardly and downwardly.

Figure 6 is a schematic rear end view of the picker head with parts in section and with the drive elements and housing removed to clearly show the relationship between the various parts of the picker head which directly engage a corn stalk passing therethrough.

Figure 7 is a fragmentary perspective view of the front of the picker head, showing the front mounting for the stalk support and spacer bar.

Figure 8 is a fragmentary perspective view, partially in section, looking toward the rear of

2 the picker head and showing the rear mounting for the stalk support and spacer bar.

Figure 9 is a view of the framework forming part of the invention, as seen from above.

Figure 10 is a left side elevation of the framework of Figure 9, as seen looking upwards toward Figure 9.

Figure 11 is a front end elevational view of Figure 10 as seen from the left of Figure 10, and Figure 12 is a rear end elevational view of Figure 10, as seen from the right of Figure 10.

In order to understand clearly the nature of the invention and the best means for carrying it out, reference may now be had to the drawings, in which like numerals denote similar parts throughout the several views.

As shown, there is a tractor having a chassis 12 with a motor 14, the chassis being supported upon rear wheels 16 and front wheels 18. Two frames like the one shown in Figure 9 are secured to the sides of the tractor chassis, the frame 20 being intended for mounting on the left side of the chassis when viewed from the driver's seat. The other frame is like frame 20, but is oppositely oriented in its construction, since it is mounted on the right side of the chassis.

The frames 20 are made of longitudinal and lateral iron or steel bars 22, which are preferably in the shape of structural angle irons for strength and rigidity when assembled. The frames have suitable bearings in which the various rotatable members are journaled, as will be described below. Each frame is provided with an inclined upper auger 24 having an auger shaft 26 journaled at its ends in bearings 28 and 30.

A cutter shaft 32, which is a two inch square bar turned round at its rearward end, is journaled at both ends in the bearings provided in the frame 20, the axis of the cutter shaft being parallel to that of the upper auger shaft 26.

The cutter shaft, as best shown in Figures 6 and 7, carries four cutter blades 40 secured to the flat longitudinal faces of the cutter shaft by means of bolts or screws 42 which are offset so the bolts do not interfere. The cylindrical rearward end of the cutter shaft is engaged with a shaft that extends through the forward side of the motor gear housing 44 and is driven direct from the hydraulic motor 46 at a preferred speed of from 2000 to 2500 revolutions per minute. The hydraulic motor 46 has ducts 48 and 50 through which it is supplied with fluid circulated by a pump (not shown) which is driven off the tractor motor 14.

As best shown in Figure 6, the cutter blades 40 start at the bottom of the corn stalk 52 and cut it in short lengths on the order of about two and one-half to three inches in length, until it reaches the shank of the ear 54. The cutter blades are preferably made of hardened carbon steel.

A lower spiral conveyor or auger 56 has an inclined shaft 58 which is journaled in front and rear bearings in the frame, similarly to upper conveyor 24, both conveyor shafts being parallel. As best shown in Figure 1, the spiral blades of the upper and lower conveyors are oppositely oriented relative to each other. The lower spiral conveyor 56 is used to carry the detached ears shown at 60 in Figure 6, back to the endless belt conveyors 62 which move rearwardly in the direction of the arrows 64 shown in Figures 2 and 3.

The spiral conveyor 24 and cutter shaft 32 with its blades 40, combined with a deck plate 68, a feed chain 70, a stalk supporting member 80 and a spacer bar 78, form a picker head, indicated generally by the numeral 65.

The upper spiral auger 24 is the first of the moving parts of the picker head 65 to come in contact with the corn stalks. Its purpose is to carry the stalks evenly into the station where the blades 40 come in contact with and start cutting off the stalks close to the ground. The blades 40 keep cutting the stalk off in lengths even after the shank of the ear has been cut and the ear dropped in the trough 66. The trough 66 is a semi-cylindrical upwardly open steel trough above which the lower spiral conveyor 56 is rotatably disposed and in which the conveyor 56 delivers the detached ears 60 to the endless belt conveyor 62. This trough is welded into the framework of angles as shown in Figure 12 and forms a stiffener to the picker head assembly.

As best seen in Fig. 6 the frame includes a deck plate 68 running the length of the picker head which has welded along its inner edge a rod 69 to provide a smooth surface for the stalks to move against. The rod 69 and a spacer bar 78 form a guide channel through which the corn stalks pass during the cutting operation. The deck plate 68 carries a front sprocket wheel 74a and a rear sprocket wheel 74b about which passes a feed chain 70 having outwardly projecting fingers 72 which carry the stalks into the picker head and keep them moving toward the rear thereof. The rear sprocket wheel 74b is mounted on a stub shaft 75 having one of a pair of intermeshing bevel gears 76 and 76a through which the feed chain 70 is driven; while the front sprocket wheel 74a has its spindle arranged to act as a tightener for the feed chain 70.

As best seen in Figs. 7 and 8, a front bracket 82 and a rear bracket 86 are mounted on the frame to support a rotatable stalk-supporting member 80 in substantially parallel spaced relation to the cutter blades 40. The bracket 82 is adjustable toward and from the cutter shaft by means of the bolt 84; and the bracket 86, which pivots about a screw 88 on a bushing 90, is similarly adjustable by means of the bolt 94. Thus the space between the cutter blades 40 and the stalk-supporting member 80 may be varied to accommodate the picker head to handle corn of various stalk sizes and densities, and to compensate for wear in the cutter blades 40 and other parts. The stalk-supporting member 80 acts as the backing member against which the stalks are pressed as the blades 40 chop into them and sever the ears therefrom. A coil compression spring 85 surrounds the bolt 84 so as to leave the stalk-supporting member 80 free to accommodate itself to unusually heavy clumps of stalks, thus relieving any tendency to stall the cutter and equalizing the load on the drive mechanism.

The location of the spacer bar 78 with respect to the stalk-supporting member 80 and the rod 69 on the deck plate 68 determines the length of the shank of the ear and assures the tipping of the ear into the trough 66. Accordingly, the spacer bar 78 is mounted for lateral and perpendicular movement with respect to said members. As seen in Fig. 7, its forward end is welded to an arm 96, and adjustability in two directions is provided by extending the mounting bolts 98 for the arm 96 through cross slots 97 and 99. As seen in Fig. 8, its rear end is secured to a bracket 100 which is adjustable in two directions by reason of cross slots 101 and 103 through which its mounting bolts 88 and 102 are respectively passed.

The driving mechanism is powered by the use of a hydraulic motor 46, or by a separate gasoline engine, not shown. The motor is attached to a suitable housing 44 and train of gears and reductions to get the proper speeds for each drive.

A sprocket chain 104 which engages a sprocket wheel 106 keyed on the shaft 58 of the lower spiral conveyor 56, also engages a sprocket wheel 108 keyed on the rotatable shaft 110, the latter having keyed on its rearward end a sheave 112. A belt 114 connects the sheave 112 with a pulley wheel 114' keyed on drive shaft 116 which derives power from the motor through spur gear 118, thus driving shaft 110.

Shaft 26 has a pulley wheel 120 keyed thereon, which is encircled by belt 122 also encircling pulley wheel 124 on power drive shaft 126, the latter also being driven from the motor through the gear housing as shown.

As shown in Figure 1, there is a tubular bar 128 which is attached to the tractor by special brackets, not shown, and which carries the rear or upper end of both the right and left picker units hinging on this tubular bar in trunnion block bearing 130.

The device is provided with right and left snouts 132 formed of sheet metal, which are adjustable up and down independently and are hence flexible in operation. The snouts act as covers for the front end of the picker unit and as a guide for the operator in following the corn rows. There is also a center snout 134, also formed of sheet metal, and which is adjustable, but attached to both the right and left picker head or units. They may be lifted as a complete unit assembly on trunnion block 130 by means of the hydraulic cylinder 136, which is the lifting cylinder carried on the front end of the tractor as shown, and which hoists the picker units with the center and side snouts whenever required, such as for moving over ditches.

The hydraulic cylinder has a cross member 138 with pulleys 140 on each end, over which extend cables 142 the outer ends of which are attached to the picker head assembly for raising and lowering it.

It will be seen that as the machine travels down the rows of corn stalks, the stalks are drawn into the machine in upright position, as shown in Figure 6, being cut into short lengths by the cutters 32, the ears being dropped into the trough 66 for being conveyed rearwardly onto the belts 64 whence they are conveyed further to be dumped into a truck or trailer hitched to the rear of the tractor, or following it under its own power.

Although we have described a preferred embodiment of our invention in specific terms, it is to be understood that various changes may be made in size, shape, materials and arrangement of the various parts without departing from the spirit and scope of the invention as claimed.

We claim:

1. A corn harvester adapted to be mounted on a tractor comprising: a main frame; a picker head extending longitudinally thereof; a housing on said frame provided with guide members for directing corn stalks toward said picker head; a driven conveyor to feed corn stalks to said picker head; a feed member provided with spaced projecting fingers, said member being spaced vertically from and driven in timed relation with said conveyor so as to cooperate therewith to feed corn directly rearwardly to the picker head in an upright position; and a rotatable cutter in said picker head to cut the corn stalks at short intervals progressively upward and shear the ears therefrom.

2. A corn harvester of the character described in claim 1 wherein the picker head includes a stalk-supporting member in substantially parallel spaced relation to the cutter, and a conveyor adjoins the stalk-supporting member to receive the sheared ears and carry them from the picker head.

3. A corn harvester of the character described in claim 1 wherein the picker head includes a pair of spaced bars parallel to the cutter forming a narrow guideway through which the corn stalks are fed adjacent the cutter.

4. A corn harvester of the character described in claim 1 wherein the picker head includes a pair of spaced bars parallel to the cutter forming a narrow guideway through which the cornstalks are fed adjacent the cutter, one of said bars being movable so as to vary the breadth and height of the guideway.

5. A corn harvester adapted to be mounted on a tractor, comprising: a main frame; an upwardly and rearwardly inclined rotatable cutter shaft provided with a plurality of longitudinally disposed blades; a stalk-supporting member in parallel spaced relation to said cutter shaft and normally spaced only slightly from the path taken by the edges of said blades; driven feed means for feeding corn stalks directly rearwardly between said cutter blades and said stalk-supporting member in upright position so that the stalks are cut at short intervals progressively upward and the ears are sheared therefrom; a U-shaped trough adjacent the stalk-supporting member; and a spiral conveyor rotatably mounted in said U-shaped trough to remove sheared ears of corn.

EDWIN F. GREEDY.
EDWARD J. SCHAAF.

REFERENCES CITED

The following references are of record in the file of this patent:

UNITED STATES PATENTS

| Number | Name | Date |
| --- | --- | --- |
| Re. 22,697 | McEachern | Nov. 27, 1945 |
| 389,117 | Stone | Sept. 4, 1888 |
| 461,246 | Meader | Oct. 13, 1891 |
| 872,821 | Johnson | Dec. 3, 1907 |
| 876,189 | Ingersoll | Jan. 7, 1908 |
| 1,136,624 | Small | Aug. 20, 1915 |
| 1,237,832 | Smith | Aug. 21, 1917 |
| 1,392,258 | Mayer | Sept. 27, 1921 |
| 1,855,109 | Justman | Apr. 19, 1932 |
| 2,170,573 | Pierson | Aug. 22, 1939 |
| 2,182,772 | Nightenhelser et al. | Dec. 5, 1939 |
| 2,210,341 | Rund, Jr. | Aug. 6, 1940 |
| 2,406,058 | Boone | Aug. 20, 1946 |
| 2,434,124 | Schaaf et al. | Jan. 6, 1948 |

FOREIGN PATENTS

| Number | Country | Date |
| --- | --- | --- |
| 9,023 | Netherlands | Feb. 17, 1923 |